(12) United States Patent
Udagawa

(10) Patent No.: US 10,637,130 B2
(45) Date of Patent: Apr. 28, 2020

(54) ANTENNA DEVICE

(71) Applicant: Mitsubishi Electric Corporation, Chiyoda-ku (JP)

(72) Inventor: Shigeo Udagawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/772,632

(22) PCT Filed: Dec. 15, 2016

(86) PCT No.: PCT/JP2016/087426
§ 371 (c)(1),
(2) Date: May 1, 2018

(87) PCT Pub. No.: WO2017/104761
PCT Pub. Date: Jun. 22, 2017

(65) Prior Publication Data
US 2019/0123432 A1 Apr. 25, 2019

(30) Foreign Application Priority Data

Dec. 17, 2015 (JP) .................................. 2015-246664
Jun. 17, 2016 (WO) .................. PCT/JP2016/068160

(51) Int. Cl.
*H01Q 3/28* (2006.01)
*H01Q 1/32* (2006.01)
(Continued)

(52) U.S. Cl.
CPC ............. *H01Q 1/3233* (2013.01); *G01S 7/02* (2013.01); *G01S 13/93* (2013.01); *H01Q 3/2617* (2013.01);
(Continued)

(58) Field of Classification Search
CPC .. H01Q 1/3233; H01Q 3/2617; H01Q 21/061; H01Q 21/062; H01Q 21/08; H01Q 21/22; G01S 7/02; G01S 13/93
See application file for complete search history.

(56) References Cited

U.S. PATENT DOCUMENTS

2008/0136553 A1\* 6/2008 Choi .................... H01Q 9/0457
333/32
2009/0085805 A1\* 4/2009 Oomuro ................. H01Q 1/246
342/360

(Continued)

FOREIGN PATENT DOCUMENTS

CN 1722520 A 1/2006
CN 108370096 A 8/2018
(Continued)

OTHER PUBLICATIONS

International Search Report dated Mar. 7, 2017 in PCT/JP2016/087426, filed on Dec. 15, 2016.
(Continued)

*Primary Examiner* — Graham P Smith
(74) *Attorney, Agent, or Firm* — Oblon, McClelland, Maier & Neustadt, L.L.P.

(57) ABSTRACT

An antenna device includes an array antenna formed of five radiating elements arrayed on a dielectric substrate, and a feeder circuit that feeds a high frequency signal to the radiating elements making up the array antenna. The five radiating elements are arrayed on a first straight line drawn in a direction horizontal to the ground, and an excitation voltage of the radiating element positioned at the center of the array is set to be 2.2 times or more an average value of excitation voltages of the other radiating elements.

8 Claims, 8 Drawing Sheets

(51) Int. Cl.
  *G01S 13/93* (2020.01)
  *H01Q 21/08* (2006.01)
  *H01Q 21/22* (2006.01)
  *G01S 7/02* (2006.01)
  *H01Q 21/06* (2006.01)
  *H01Q 3/26* (2006.01)

(52) U.S. Cl.
  CPC ............ *H01Q 3/28* (2013.01); *H01Q 21/061* (2013.01); *H01Q 21/062* (2013.01); *H01Q 21/08* (2013.01); *H01Q 21/22* (2013.01)

(56) References Cited

U.S. PATENT DOCUMENTS

| | | | |
|---|---|---|---|
| 2010/0039187 A1* | 2/2010 | Yurugi | H01P 5/16 333/136 |
| 2010/0238067 A1 | 9/2010 | Nakabayashi et al. | |
| 2018/0309195 A1 | 10/2018 | Udagawa | |
| 2019/0123432 A1 | 4/2019 | Udagawa | |

FOREIGN PATENT DOCUMENTS

| | | |
|---|---|---|
| EP | 1 417 733 A1 | 5/2004 |
| JP | 2004-040299 A | 2/2004 |
| JP | 2008-085998 A | 4/2008 |
| WO | WO 03/017422 A1 | 2/2003 |
| WO | WO 2008/038576 A1 | 4/2008 |

OTHER PUBLICATIONS

Extended European Search Report dated Nov. 8, 2018 in Patent Application No. 16875738.3, 7 pages.
United States Office Action dated Sep. 16, 2019 in U.S. Appl. No. 15/770,218.
United States Final Office Action dated Mar. 4, 2020 in U.S. Appl. No. 15/770,218 (8 pages).
Chinese Office Action dated Dec. 19, 2019 in Patent Application No. 201680072746.0, with English translation.
The First Office Action dated Feb. 1, 2020 in corresponding Chinese Patent Application No. 201680072734.8 (with English translation)(15 pages).

* cited by examiner

ANTENNA DEVICE

FIELD

The present invention relates to an antenna device for use in a radar detecting a target, and more particularly to an antenna device suitable for use in a vehicle collision avoidance radar.

BACKGROUND

A vehicle collision avoidance radar is a radar mounted on a vehicle and is used to detect a distance to a target, which includes a vehicle traveling ahead, as well as a direction and a relative speed of the target. A signal transmitted from the radar mainly uses a millimeter wave frequency band.

A transmitting antenna and a receiving antenna are provided separately in the vehicle collision avoidance radar, where two or more channels are typically provided for the receiving antenna. The vehicle collision avoidance radar emits radio waves from the transmitting antenna, receives a reflected wave from a target by the receiving antenna, and performs signal processing. At this time, the distance can be obtained from the time required for the reflected wave to return, the direction can be obtained from a phase difference between the receiving channels, and the relative speed can be obtained from the frequency of the reflected wave.

A desirable characteristic of the vehicle collision avoidance radar is to be able to detect a target as far ahead as possible and to perform detection as wide as possible to the sides in order to deal with an object popping out from the side, for example. That is, a desirable characteristic of the antenna includes a high front gain and no presence of a null out to a wide angle. Note that the null refers to a point with the minimum gain in an antenna radiation pattern such as a boundary between a main lobe and a side lobe, and increasing the gain of the null is called null filling.

An antenna device (hereinafter referred to as a "conventional antenna device" as appropriate) described in Patent Literature 1 is known as an antenna device performing null filling. The conventional antenna device includes four radiating elements arrayed in a direction perpendicular to the ground and a feeder circuit that feeds high frequency signals to the four radiating elements where, when the radiating elements are numbered in order from the top as element 1, element 2, element 3, and element 4, power is fed to an upper radiating element group (element 1 and element and a lower radiating element group (element 3 and element 4) with an unequal division ratio.

As illustrated in FIG. 2 and FIG. 3 of Patent Literature 1, the conventional antenna device has the radiation pattern in which radiated fields from an even number of radiating elements (four in the literature) are added in phase to obtain the maximum gain (0 dB) at 0 degree, or in the front direction of an antenna plane. On the other hand, in the vicinity of 17 degrees within a vertical plane, element 1 is opposite in phase to element 3 while element 2 is opposite in phase to element 4, so that a vector sum of the four radiated fields is the minimum, or becomes a first null.

The literature describes that, in the conventional antenna device, the gain of the first null is substantially equal to 0 (=30 dB or less) when power is fed to the upper radiating element group and the lower radiating element group with an equal division ratio (1:1), but when power is fed with an unequal division ratio (1:2 to 1:4), the vector sum of the four radiated fields does not equal 0 so that the gain of the first null increases to about −18 dB to −12 dB.

CITATION LIST

Patent Literature

Patent Literature 1: Japanese Patent Application Laid-open No. 2004-40299

SUMMARY

Technical Problem

As described above, the conventional antenna device has the effect of increasing the gain of the first null positioned in the vicinity of 17 degrees but has a problem that there is no effect of null filling for a second null positioned in the vicinity of 6 degrees.

The problem rises because, although not illustrated in FIGS. 2 and 3 of Patent Literature 1, element 1 is opposite in phase to element 2 while element 3 is opposite in phase to element 4 in the vicinity of 36 degrees to result in the vector sum of the four radiated fields substantially equal to 0 regardless of the power division ratio to the upper radiating element group and the lower radiating element group. It is thus difficult to use the conventional antenna device in a wide angular range including the vicinity of 36 degrees corresponding to the second null and exceeding the second null.

The present invention has been made in view of the above, and an object of the invention is to obtain an antenna device that enables null filling not only for a first null but for second and successive nulls.

Solution to Problem

In order to solve the above-mentioned problems and achieve the object, the present invention provides an antenna device including an odd number of three or more radiating elements that are arrayed in a first direction and a feeder circuit that feeds a high frequency signal to the radiating elements, where an excitation voltage of a radiating element positioned at the center is set to be 2.2 times or more an average value of excitation voltages of the other radiating elements.

Advantageous Effects of Invention

The present invention enables null filling for second and successive nulls.

DESCRIPTION OF EMBODIMENTS

An antenna device according to embodiments the present invention will now be described in detail with reference to the drawings. Note that the present invention is not limited to the following embodiments.

First Embodiment

Figure 1:
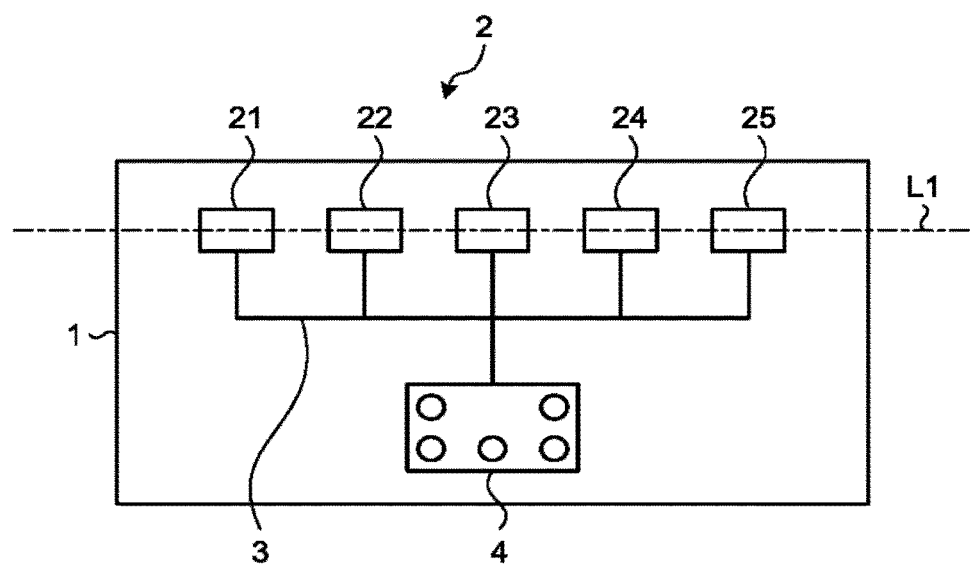
FIG. 1 is a front view illustrating a configuration of a first example of an antenna device according to a first embodiment.

FIG. 1 is a front view illustrating a configuration of a first example of an antenna device according to a first embodiment. FIG. 1 illustrates a case where a microstrip array antenna is formed on a dielectric substrate 1.

As illustrated in FIG. 1, the first example of the antenna device according to the first embodiment includes an array antenna 2 formed of five radiating elements 21 to 25 arrayed on the dielectric substrate 1, and a feeder circuit 3 that feeds a high frequency signal to the radiating elements 21 to 25 making up the array antenna 2. The feeder circuit 3 is electrically connected to a feeding part 4, and divides an external high frequency signal among the radiating elements 21 to 25 via the feeding part 4.

The five radiating elements 21 to 25 are arrayed on a first straight line L1 indicated by a dot dashed line virtually drawn in a direction horizontal to the ground. Note that a patch antenna is exemplified as each of the radiating elements 21 to 25, a microstrip line is exemplified as the feeder circuit 3, and a microstrip-to-waveguide transition that mutually converts a signal transmitted between the microstrip line and a waveguide is exemplified as the feeding part 4.

The radiating elements 21 to 25 are arranged at regular intervals of about 0.5 to 0.8 wavelength. The feeder circuit 3 is designed to feed the high frequency signal received via the feeding part 4 to the radiating elements 21 to 25 with unequal amplitude, equal phase, and a preset division ratio.

Next, a characteristic of the array antenna 2 in the first example will be described.

Figure 2:
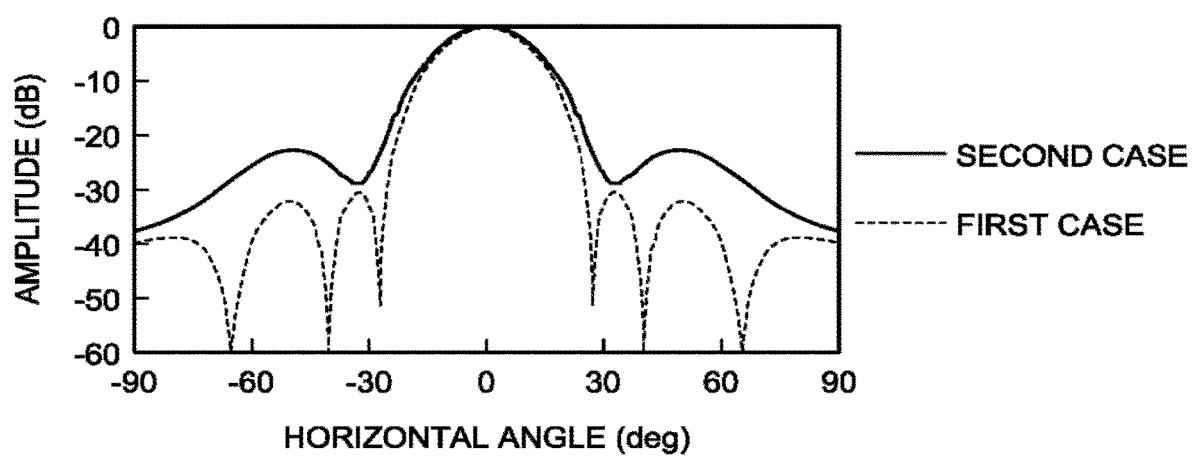
FIG. 2 is a graph illustrating a comparison of two types of radiation patterns of an array antenna according to the first example.

First, a dashed line in FIG. 2 indicates a radiation pattern for a first case in which null filling is not performed. The radiation pattern is a calculated value. Note that in calculating the radiation pattern, the radiating elements are spaced at 0.64 wavelength intervals, the amplitude distribution follows a known Taylor distribution, and a side lobe level is set to "−30 dB".

As indicated by the dashed line in FIG. 2, the first case has the radiation pattern in which radiated fields from the five radiating elements 21 to 25 are added in phase at 0 degree corresponding to the front direction, so that the gain is maximized (0 dB). There exist first nulls at ±28 degrees, second nulls at ±41 degrees, and third nulls at ±66 degrees. Therefore, when this radiation pattern is used, the usable range of the radar is limited from the front direction to the inside of the first nulls, or about ±24 degrees.

The amplitude distribution for the first case is illustrated in Table 1 below.

[Table 1]

TABLE 1

| | AMPLITUDE DISTRIBUTION FOR FIRST CASE (WITHOUT NULL FILLING) | | | | |
| --- | --- | --- | --- | --- | --- |
| | RADIATING ELEMENT 21 | RADIATING ELEMENT 22 | RADIATING ELEMENT 23 | RADIATING ELEMENT 24 | RADIATING ELEMENT 25 |
| EXCITATION VOLTAGE | 0.33 | 0.77 | 1.00 | 0.77 | 0.33 |
| RATIO WITH RESPECT TO AVERAGE VALUE (NOTE) | 0.60 | 1.40 | 1.82 | 1.40 | 0.60 |

(NOTE)
RATIO WITH RESPECT TO AVERAGE VALUE (0.55) OF FOUR RADIATING ELEMENTS EXCLUDING CENTER ELEMENT

As illustrated in Table 1, an excitation voltage of the radiating element 23 at the center is normalized to "1". On the other hand, an average value of excitation voltages of the remaining four radiating elements 21, 22, 24, and 25 excluding the radiating element 23 at the center is calculated to be "0.55". The ratio of the excitation voltage of the radiating element 23 at the center to the average value is 1.82 (≈1.00/0.55), which is a value less than 2.2.

Next, a solid line in FIG. 2 indicates a radiation pattern (calculated value) for a second case in which the excitation voltage of the radiating element 23 positioned at the center is increased to 1.26 times (+2 dB) that of the first case. Compared to the first case, the gains in the vicinity of ±28 degrees, ±41 degrees, and ±66 degrees are increased, where null filling is performed on all the nulls. Therefore, when this radiation pattern is used, the usable range of the radar is widened to ±70 degrees or wider.

The amplitude distribution for the second case is illustrated in Table 2 below.

[Table 2]

TABLE 2

AMPLITUDE DISTRIBUTION FOR SECOND CASE (WITH NULL FILLING)

| | RADIATING ELEMENT 21 | RADIATING ELEMENT 22 | RADIATING ELEMENT 23 | RADIATING ELEMENT 74 | RADIATING ELEMENT 25 |
|---|---|---|---|---|---|
| EXCITATION VOLTAGE | 0.33 | 0.77 | 1.26 | 0.77 | 0.33 |
| RATIO WITH RESPECT TO AVERAGE VALUE (NOTE) | 0.60 | 1.40 | 2.29 | 1.40 | 0.60 |

(NOTE)
RATIO WITH RESPECT TO AVERAGE VALUE (0.55) OF FOUR RADIATING ELEMENTS EXCLUDING CENTER ELEMENT

Comparing Table 1 and Table 2, the ratios of the excitation voltages of the radiating elements other than the radiating element 23 at the center in Table 2 are the same as those in Table 1. On the other hand, the only difference from Table 1 is that the ratio of the excitation voltage of the radiating element 23 at the center to the average value is 2.29 (≈1.26/0.55). Therefore, one can see that the effect of null filling is obtained by the change in the value of the ratio of the excitation voltage for the radiating element 23 at the center.

Figure 3:
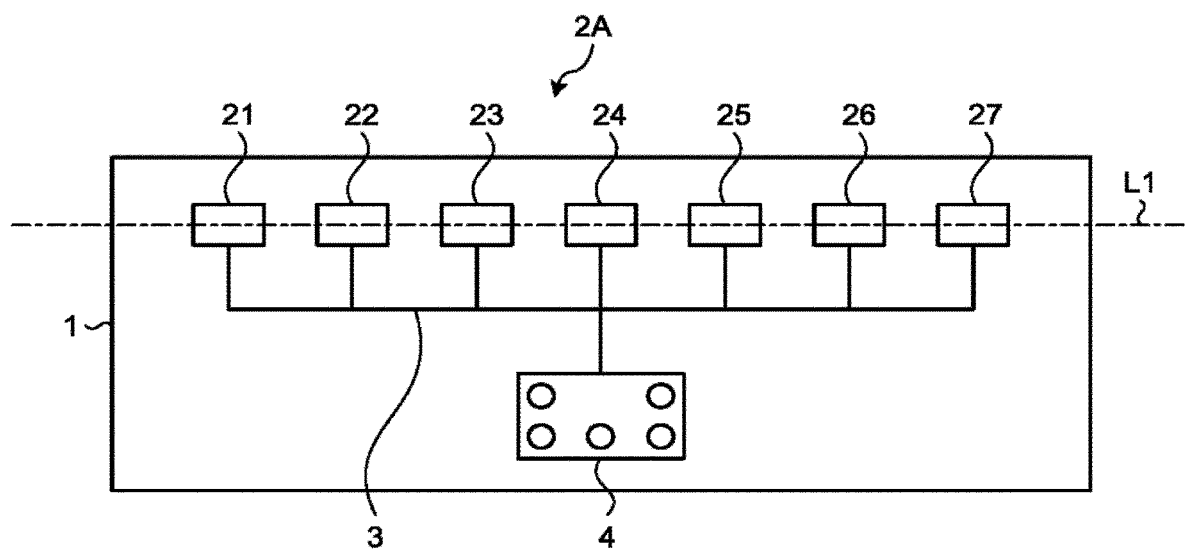
FIG. 3 is a front view illustrating a configuration of a second example of the antenna device according to the first embodiment.

Next, there will be described an example different from an example in FIG. 1 of the antenna device according to the first embodiment. FIG. 3 is a front view illustrating a configuration of a second example of the antenna device according to the first embodiment. As illustrated in FIG. 3, the second example of the antenna device according to the first embodiment includes an array antenna 2A formed of seven radiating elements 21 to 27 arrayed on the dielectric substrate 1, and the feeder circuit 3 that feeds a high frequency signal to the radiating elements 21 to 27 making up the array antenna 2A. The feeder circuit 3 is electrically connected to the feeding part 4, and divides an external high frequency signal among the radiating elements 21 to 27 via the feeding part 4.

The seven radiating elements 21 to 27 are arrayed on the first straight line L1 indicated by the dot dashed line virtually drawn in the direction horizontal to the ground. As with the first example, a patch antenna is exemplified as each of the radiating elements 21 to 27, a microstrip line is exemplified as the feeder circuit 3, and a microstrip-to-waveguide transition that mutually converts a signal transmitted between the microstrip line and the waveguide is exemplified as the feeding part 4.

The radiating elements 21 to 27 are arranged at regular intervals of about 0.5 to 0.8 wavelength. The feeder circuit 3 is designed to feed the high frequency signal received via the feeding part 4 to the radiating elements 21 to 27 with unequal amplitude, equal phase, and a preset division ratio.

Next, a characteristic of the array antenna 2A in the second example will be described.

Figure 4:
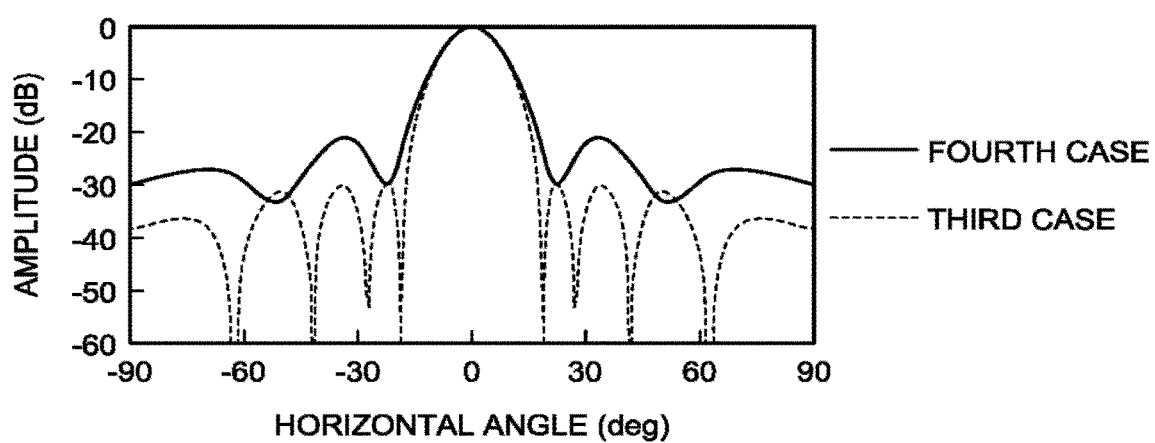
FIG. 4 is a graph illustrating a comparison of two types of radiation patterns of an array antenna according to the second example.

First, a dashed line in FIG. 4 indicates a radiation pattern for a third case in which null filling is not performed. The radiation pattern is a calculated value. Note that in calculating the radiation pattern, the radiating elements are spaced at 0.64 wavelength intervals, the amplitude distribution follows a known Taylor distribution, and a side lobe level is set to "−30 dB".

As indicated by the dashed line in FIG. 4, the third case has the radiation pattern in which radiated fields from the seven radiating elements 21 to 27 are added in phase at 0 degree corresponding to the front direction, so that the gain is maximized (0 dB). There also exist first nulls around ±19 degrees, second nulls around ±28 degrees, third nulls around ±44 degrees, and fourth nulls around ±6.5 degrees. Therefore, when this radiation pattern is used, the usable range of the radar is limited from the front direction to the inside of the first nulls, or about ±18 degrees.

The amplitude distribution for the third case is illustrated in Table 3 below.

[Table 3]

TABLE 3

AMPLITUDE DISTRIBUTION FOR THIRD CASE (WITHOUT NULL FILLING)

| | RADIATING ELEMENT 21 | RADIATING ELEMENT 22 | RADIATING ELEMENT 23 | RADIATING ELEMENT 24 | RADIATING ELEMENT 25 | RADIATING ELEMENT 26 | RADIATING ELEMENT 27 |
|---|---|---|---|---|---|---|---|
| EXCITATION VOLTAGE | 0.29 | 0.58 | 0.88 | 1.00 | 0.88 | 0.58 | 0.29 |
| RATIO WITH RESPECT TO AVERAGE VALUE (NOTE) | 0.50 | 1.00 | 1.52 | 1.72 | 1.52 | 1.00 | 0.50 |

(NOTE)
RATIO WITH RESPECT TO AVERAGE VALUE (0.58) OF SIX RADIATING ELEMENTS EXCLUDING CENTER ELEMENT

As illustrated in Table 3, an excitation voltage of the radiating element 24 at the center is normalized to "1". On the other hand, an average value of excitation voltages of the remaining six radiating elements 21, 22, 23, 25, 26, and 27 excluding the radiating element 24 at the center is calculated to be "0.58". The ratio of the excitation voltage of the radiating element 24 at the center to the average value is 1.72 (1.00/0.58), which is a value less than 2.2.

Next, a solid line in FIG. 4 indicates a radiation pattern (calculated value) for a fourth case in which the excitation voltage of the radiating element 24 positioned at the center is increased to 1.33 times (+2.5 dB) that of the third case. Compared to the third case, the gains in the vicinity of ±19 degrees, ±28 degrees, ±44 degrees, and ±65 degrees are increased, where null filling is performed on all the nulls. Therefore, when this radiation pattern is used, the usable range of the radar is widened to ±70 degrees or wider.

The amplitude distribution for the fourth case is illustrated in Table 4 below.

[Table 4]

TABLE 4

AMPLITUDE DISTRIBUTION FOR FOURTH CASE (WITH NULL FILLING)

| | RADIATING ELEMENT 21 | RADIATING ELEMENT 22 | RADIATING ELEMENT 23 | RADIATING ELEMENT 24 | RADIATING ELEMENT 25 | RADIATING ELEMENT 26 | RADIATING ELEMENT 27 |
|---|---|---|---|---|---|---|---|
| EXCITATION VOLTAGE | 0.29 | 0.58 | 0.88 | 1.33 | 0.88 | 0.58 | 0.29 |
| RATIO WITH RESPECT TO AVERAGE VALUE (NOTE) | 0.50 | 1.00 | 1.52 | 2.29 | 1.52 | 1.00 | 0.50 |

(NOTE)
RATIO WITH RESPECT TO AVERAGE VALUE (0.58) OF SIX RADIATING ELEMENTS EXCLUDING CENTER ELEMENT

Comparing Table 3 and Table 4, the ratios of the excitation voltages of the radiating elements other than the radiating element 24 at the center in Table 4 are the same as those in Table 3. On the other hand, the only difference from Table 3 is that the ratio of the excitation voltage of the radiating element 24 at the center to the average value is 2.29 (≈1.33/0.58). Therefore, one can see that the effect of null filling is obtained by the change in the value of the ratio of the excitation voltage for the radiating element 24 at the center.

Note that although the excitation voltage of the radiating element positioned at the center is set to times the average value of the excitation voltages of the other radiating elements in Table 2 and the excitation voltage of the radiating element 24 positioned at the center is set to 2.29 times the average value of the excitation voltages of the other radiating elements in Table 4, the effect of null filling can also be obtained with the excitation voltage in the range of 2.20 to 2.28 times the average value. Therefore, the ratio of the excitation voltage of the radiating element 24 positioned at the center to the average value of the excitation voltages of the other radiating elements is included in the scope of the present invention when the ratio equals 2.2 times or more.

Note that although the two examples above describe the cases of five radiating elements and seven radiating elements, the number of radiating elements is not limited to five and seven but may be an odd number of three or more. Although a detailed description will be omitted, the case of three elements can also obtain the effect of null filling by setting the excitation voltage of a radiating element positioned at the center to 2.2 times or more an average value of the excitation voltages of the other radiating elements.

Second Embodiment

Figure 5:
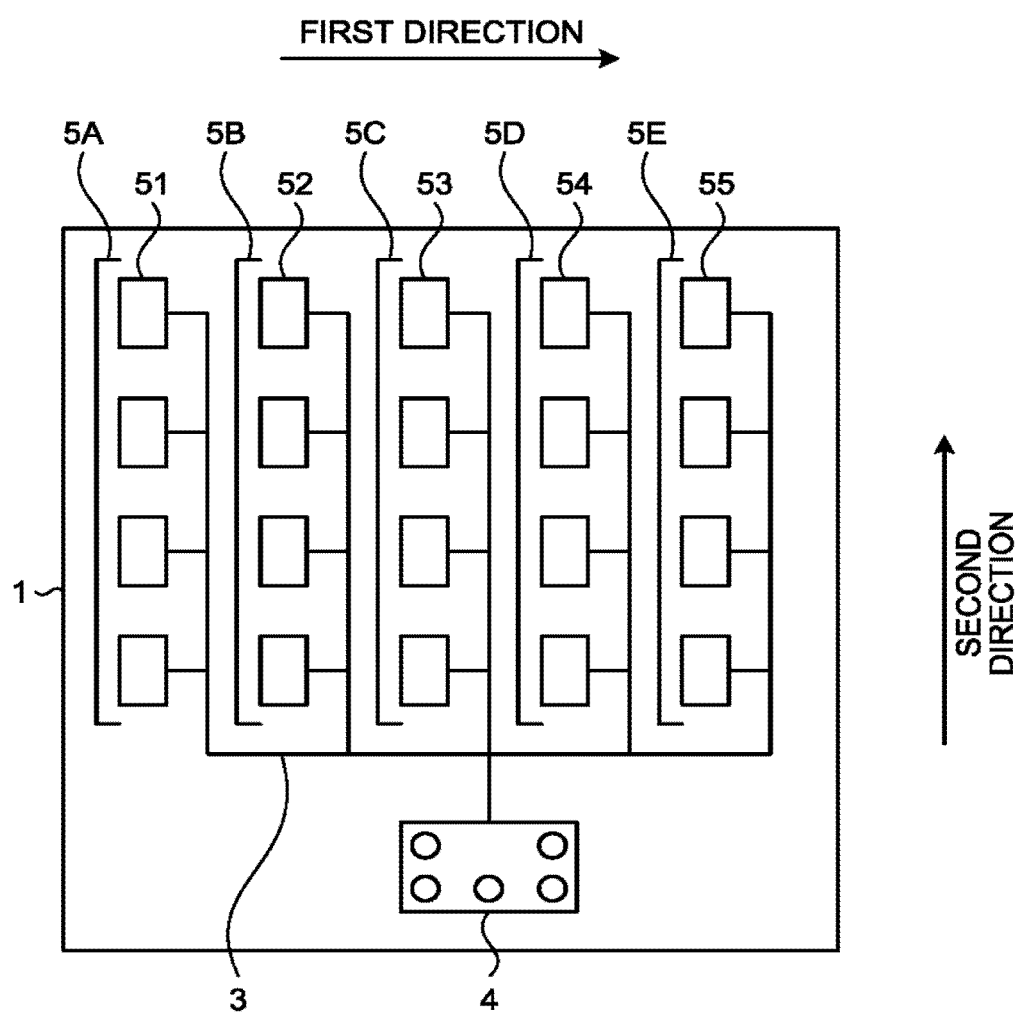
FIG. 5 is a front view illustrating a configuration of the antenna device according to a second embodiment.

FIG. 5 is a front view illustrating a configuration of the antenna device according to a second embodiment, where parts identical or equivalent to parts of the antenna device according to the first embodiment are denoted by the same reference numerals as reference numerals used in the first embodiment.

In the antenna device according to the second embodiment illustrated in FIG. 5, four element groups each formed of five radiating elements 51 to 55 arrayed in a first direction being a horizontal direction are arranged side by side in a second direction orthogonal to the first direction, or in a direction perpendicular to the ground. An antenna element group formed of the five radiating elements 51 to 55 corresponds to the array antenna 2 in the first embodiment. Thus, the antenna device according to the second embodiment is configured as a planar array in which a plurality of the array antennas 2 is arrayed in the vertical direction, the array antenna 2 being arrayed in the horizontal direction in the first embodiment. Note that although the four element groups, each formed of the five radiating elements 51 to 55, are arrayed in the second direction in FIG. 5, the number of element groups may be two or more, or plural.

Feed to the planar array is performed for each element group including four elements arrayed in the vertical direction, that is, for each element group connected to the same feeder circuit 3. When a first element group 5A, a second element group 5E, a third element group 5C, a fourth element group 5D, and a fifth element group 5E are arrayed in this order from the left side of the drawing and a first element, a second element, a third element, and a fourth element are arrayed in this order from the top of the drawing, one embodiment is adapted to apply the excitation voltages illustrated in Table 2 to the first element (radiating element 51) in the first element group 5A to the first element (radiating element 55) in the fifth element group 5E, and maintain the ratios of the excitation voltages illustrated in Table 2 for the other elements, namely the second element to the fourth element, in each element group as well. Note that the excitation voltages of the first element to the fourth element in each element group need not have the same value.

The antenna device according to the second embodiment is configured as the planar array in which the plurality of the array antennas is arrayed in the vertical direction, the array antenna being arrayed in the horizontal direction in the first embodiment. Therefore, as with the antenna device according to the first embodiment, the usable range of the radar can be widened to ±70 degrees or wider and at the same time a beam in the vertical direction can be narrowed to further increase the front gain, whereby the antenna device suitable for use in a vehicle collision avoidance radar can be obtained.

Note that the configurations illustrated in the first and second embodiments are examples of the contents of the present invention and thus may be modified as described below.

For example, the antenna device according to the first and second embodiments is required to widen the angle in the horizontal direction when used as the vehicle collision avoidance radar, in which case it is preferable to excite the radiating elements arrayed in the horizontal direction with the ratios of the excitation voltages illustrated in Table 2 or Table 4. On the other hand, in the application requiring a wider angle in the vertical direction, it is preferable to excite the radiating elements arrayed in the vertical direction with the ratios of the excitation voltages illustrated in Table 2. That is, the scope of the present invention includes an embodiment in which the excitation voltage of a radiating element positioned at the center of an odd number of three or more radiating elements arrayed in the second direction perpendicular to the ground is set to be 2.2 times or more the average value of the exciting voltages of the other radiating elements, as well as an embodiment in which a plurality of element groups each arrayed in the second direction is arrayed in a direction perpendicular to the second direction to form the planar array.

Third Embodiment

Figure 6:
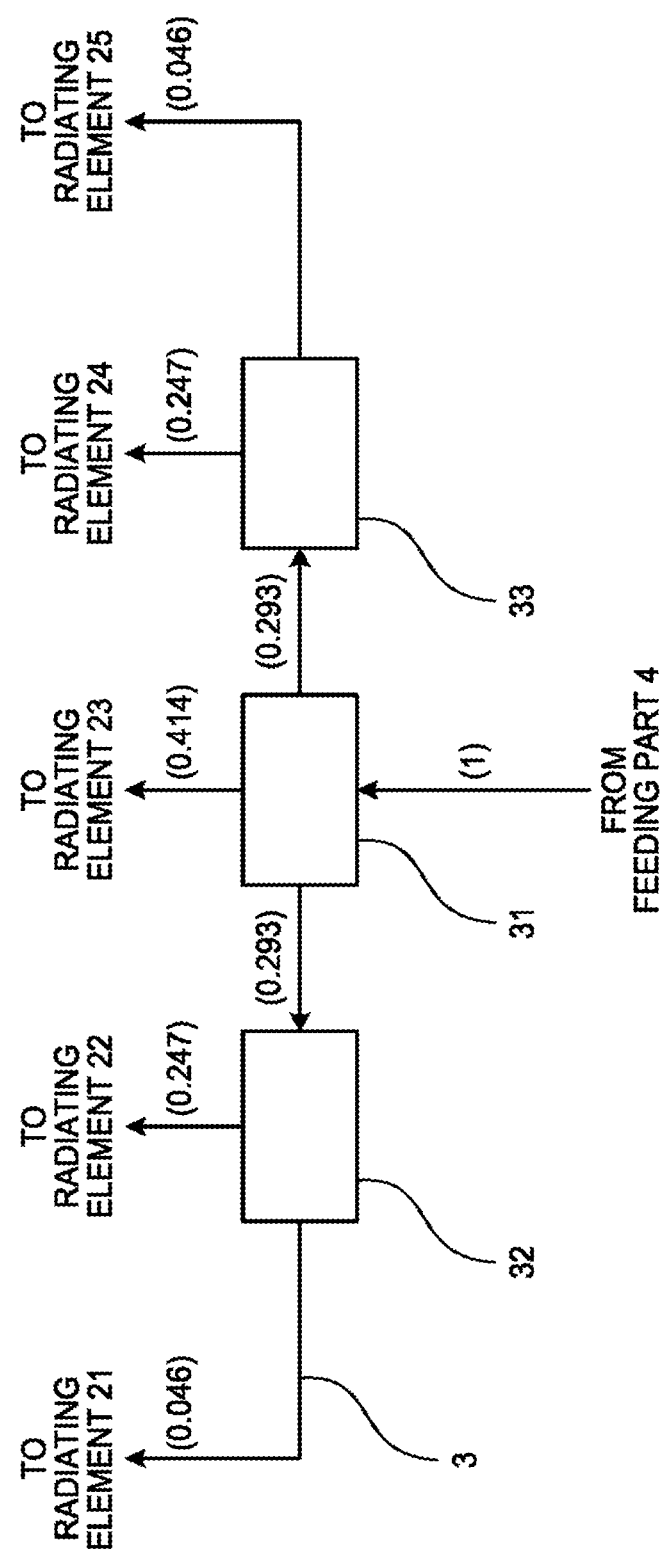
FIG. 6 is a diagram illustrating a configuration example of a feeder circuit that gives an amplitude distribution for a first case (without null filling) illustrated in Table 1.
Figure 7:
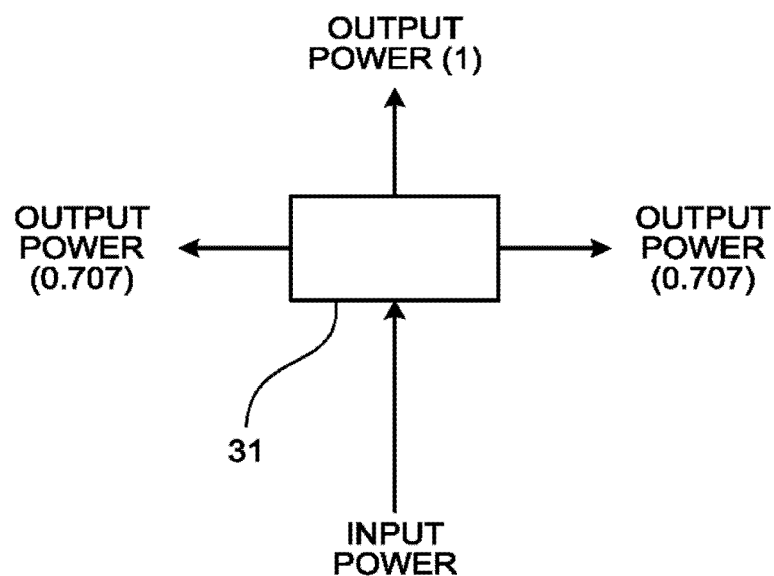
FIG. 7 is a diagram for explaining a power division ratio of a first power divider which gives the amplitude distribution for the first case.

A third embodiment will describe the feeder circuit in the antenna device of the first embodiment. Here, there will be described first a configuration example of the feeder circuit 3 that gives the amplitude distribution for the first case (without null filling) illustrated in Table 1. As illustrated in FIG. 6, the feeder circuit 3 according to the configuration example includes three power dividers 31, 32, and 33. The power divider 31 which is a first power divider is an unequal three-way divider with a power division ratio of 0.707:1: 0.707 as illustrated in FIG. 7. That is, assuming that the power distributed to the radiating element 23 positioned at the center of the array equals "1" (a relative value, the same applies hereinafter), the power divider distributes power with the magnitude of "0.707" to a radiating element group formed of the radiating elements 21 and 22 positioned on one side of the array as seen from the radiating element 23, and also distributes power with the magnitude of "0.707" to a radiating element group formed of the radiating elements 24 and 25 positioned on another side of the array as seen from the radiating element 23.

As a generalized description of the above function, the first power divider is the unequal three-way divider feeding power to each of a radiating element group positioned on one side as seen from a first radiating element and a radiating element group positioned on another side as seen from the first radiating element with a power ratio different from a power ratio of power fed to the first radiating element positioned at the center of the array in a radiating element group making up the array antenna.

Figure 8:
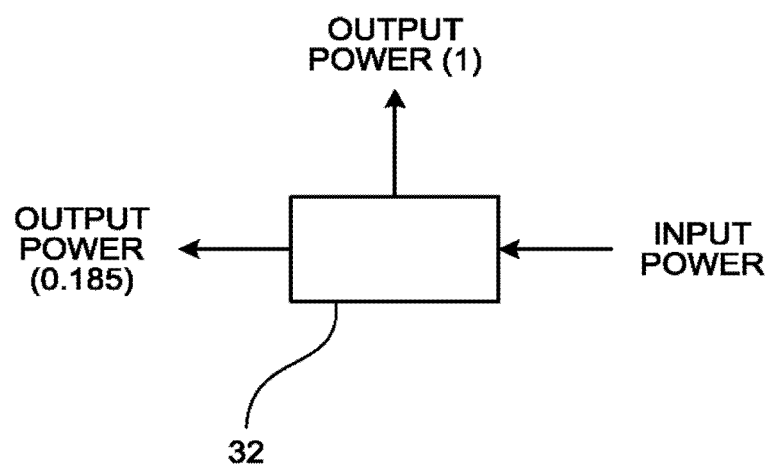
FIG. 8 is a diagram for explaining a power division ratio of a second power divider which gives the amplitude distribution for the first case.

The power divider 32 which is a second power divider in FIG. 6 is an unequal two-way divider with a power division ratio of 0.185:1 as illustrated in FIG. 8. Assuming that the power distributed to the radiating element 22 equals "1", the power divider 32 distributes power with the magnitude of "0.185" to the radiating element 1.

Figure 9:
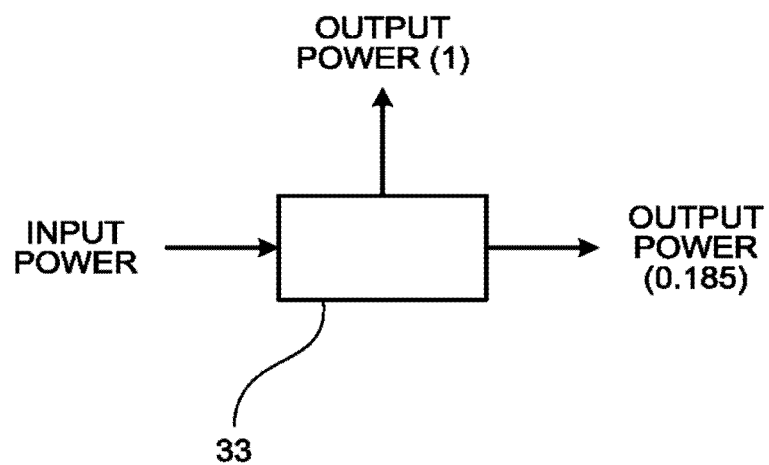
FIG. 9 is a diagram for explaining a power division ratio of a third power divider which gives the amplitude distribution for the first case.

Similarly, the power divider 33 which is a third power divider in FIG. 6 is an unequal two-way divider with a power division ratio of 0.185:1 as illustrated in FIG. 9. Assuming that the power distributed to the radiating element 24 equals "1", the power divider 33 distributes power with the magnitude of "0.185" to the radiating element 25.

That is, the second and third power dividers is each the unequal two-way divider feeding power to radiating elements or a radiating element group excluding a second radiating element with a power ratio different from a power ratio with which power is fed to the second radiating element in a radiating element group made up of radiating elements excluding the first radiating element.

The operation will now be described. In FIG. 6, high-frequency power of the relative value "1" input from the feeding part 4 is divided into three by the power divider 31 so that power of "0.293 (=0.707/(1+0.707+0.707))" is fed to the power divider 32, power of "0.414 (=1/(1+0.707+0.707))" is fed to the radiating element 23, and power of "0.293 (=0.707/(1+0.707+0.707))" is fed to the power divider 33.

The power fed to the power divider 32 is further divided into two so that power of "0.046 (=0.293×0.185/(1+0.185))" is fed to the radiating element 21 and power of "0.247 (=0.293×1/(1+0.185))" is fed to the radiating element 22.

The power fed to the power divider 33 is further divided into two so that power of "0.247 (=0.293×1/(1+0.185))" is fed to the radiating element 24 and power of "0.046 (=0.93× 0.185/(1+0.185))" is fed to the radiating element 25.

The high frequency signal fed from the feeding part 4 is thus divided among the radiating elements 21 to 25 with the power ratios of 0.046:0.247:0.414:0.247:0.046. Here, a square root of these power ratios gives voltage ratios of 0.214:0.497:0.644:0.497:0.214, and multiplication thereof by a constant 1.553 (=1/0.644) to obtain the maximum value of 1 results in the amplitude distribution in Table 1.

Figure 10:
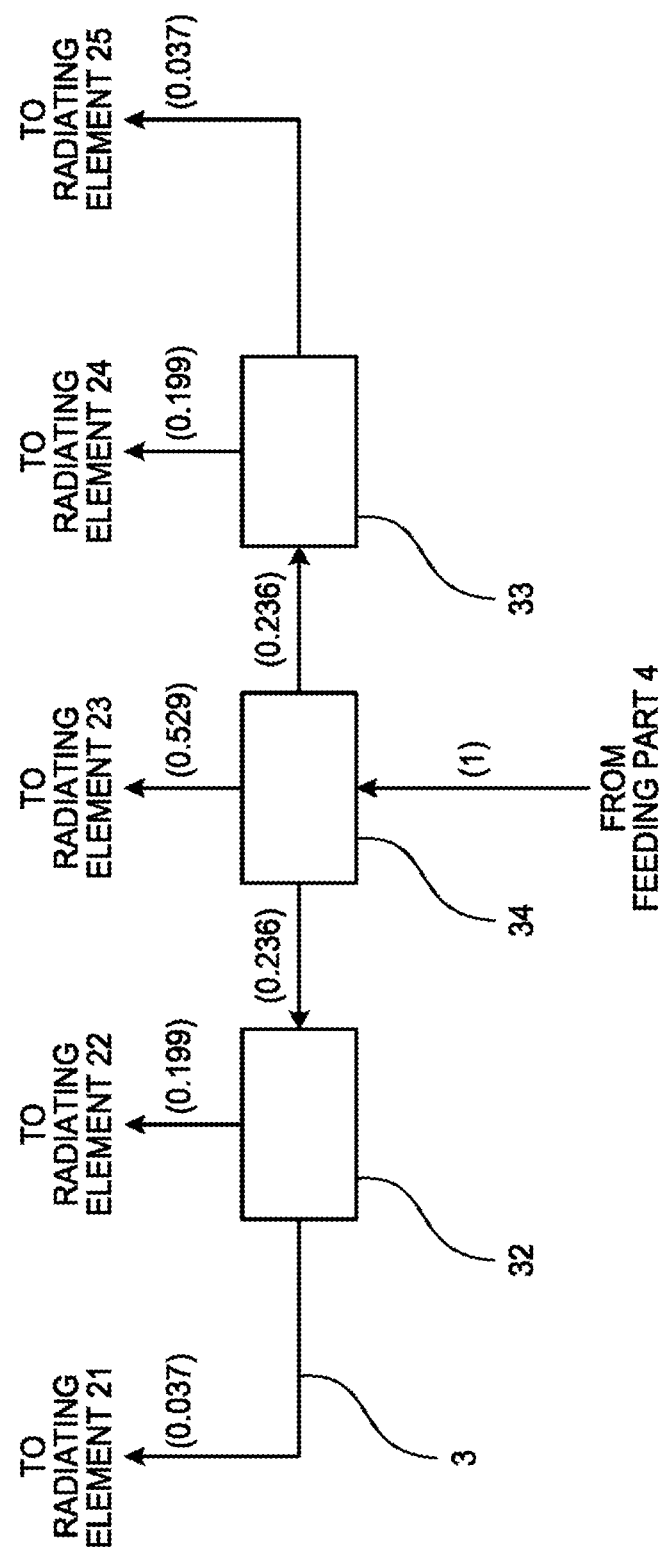
FIG. 10 is a diagram illustrating a configuration example of a feeder circuit that gives an amplitude distribution for a second case (with null filling) illustrated in Table 2.
Figure 11:
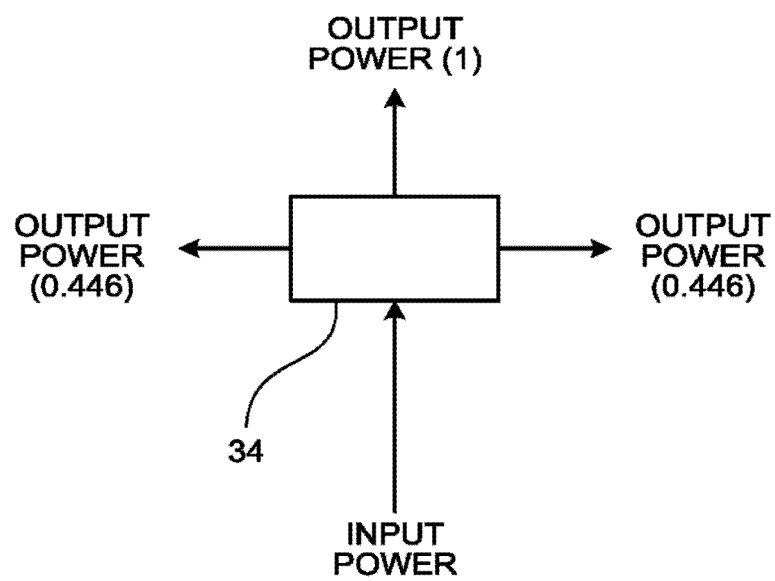
FIG. 11 is a diagram for explaining a power division ratio of the first power divider which gives the amplitude distribution for the second case.

Next, there will be described a configuration example of the feeder circuit 3 that gives the amplitude distribution for the second case (with null filling) illustrated in Table 2. As illustrated in FIG. 10, the feeder circuit 3 according to the configuration example includes three power dividers 32, 34, and 33. Here, the power divider 32 and the power divider 33 are the same as the power divider and the power divider in the first case described above, and are denoted by the same reference numerals as reference numerals in the first case. On the other hand, the power divider 34 which is a first power divider is an unequal three-way divider with a power division ratio of 0.446:1:0.446 as illustrated in FIG. 11. That is, assuming that the power distributed to the radiating element 23 positioned at the center of the array equals the relative value "1", the power divider distributes power with the magnitude of "0.446" to the radiating element group formed of the radiating elements 21 and 22 positioned on one side of the array as seen from the radiating element 23, and also distributes power with the magnitude of "0.446" to the radiating element group formed of the radiating elements 24 and 25 positioned on another side of the array as seen from the radiating element 23.

The operation will now be described. In FIG. 10, high-frequency power of the relative value "1" input from the feeding part 4 is divided into three by the power divider 34 so that power of "0.236 (=0.446/(1+0.446+0.446))" is fed to the power divider 32, power of "0.529 (=1/(1+0.446+0.446))" is fed to the radiating element 23, and power of "0.236 (=0.446/(1+0.446+0.446))" is fed to the power divider 33.

The power fed to the power divider 32 is further divided into two so that power of "0.037 (=0.236×0.18/(1+0.85))" is fed to the radiating element 21 and power of "0.199 (=0.2361/(1+0.185))" is fed to the radiating element 22.

The power fed to the power divider 33 is further divided into two so that power of "0.199 (=0.236×1/(1+0.185))" is fed to the radiating element 24 and power of "0.037 (=0.236×0.185/(1+0.185))" is fed to the radiating element 25.

The high frequency signal fed from the feeding part 4 is thus divided among the radiating elements 21 to 25 with the power ratios of 0.037:0.199:0.529:0.199:0.037. Here, a square root of these power ratios gives voltage ratios of 0.192:0.446:0.727:0.446:0.192, and multiplication thereof by a constant 1.733 (=1.26/0.727) to obtain the maximum value of 1.26 results in the amplitude distribution in Table 2.

Note that although FIGS. 6 and 10 illustrate the case of the five radiating elements, the above description can be applied not only to the case of the five radiating elements but also to a radiating element group including an odd number of three or more radiating elements. Note that in the case of three radiating elements, only the first power divider may be used without the need for the second and third power dividers. In the case of seven radiating elements, the feeder circuit can be formed of one of the first power divider, two of the second power dividers, and two of the third power dividers. Note that as illustrated in FIGS. 8 and 9, the power divider 32 which is the second power divider and the power divider 33 which is the third power divider have the same function, and can thus be the same unequal two-way divider. Therefore, the feeder circuit according to the third embodiment can be formed of one unequal three-way divider in the case of three radiating elements, or can be formed of one unequal three-way divider and an even number of two or more unequal two-way dividers in the case of an odd number of five or more radiating elements.

The configuration illustrated in the aforementioned embodiments merely illustrates an example of the content of the present invention, and can thus be combined with another known technique or partially omitted and/or modified without departing from the scope of the present invention.

REFERENCE SIGNS LIST 1 dielectric substrate; 2, 2A array antenna; 3 feeder circuit; 4 feeding part; 5A to 5E first element group to fifth element group; 21 to 27, 51 to 55 radiating element; 31, 34 power divider (first power divider); 32 power divider (second power divider); 33 power divider (third power divider).

The invention claimed is:

1. An antenna device comprising:
an odd number of three or more radiating elements that are arrayed in a first direction; and
a feeder circuit that feeds a high frequency signal to the radiating elements, wherein
an excitation voltage of a first radiating element positioned at the center of the array is set to be 2.2 times or more than an average value of excitation voltages of other radiating elements excluding the first radiating element, and
the radiating elements are arranged at regular intervals and excited with equal phase.

2. The antenna device according to claim 1, wherein a plurality of element groups each formed of the odd number of three or more radiating elements arrayed in the first direction is arrayed in a direction perpendicular to the first direction.

3. The antenna device according to claim 1, wherein
the feeder circuit includes at least one unequal three-way divider, and
the unequal three-way divider feeds power to each of a radiating element group positioned on one side as seen from the first radiating element and a radiating element group positioned on another side as seen from the first radiating element with a power ratio different from a power ratio with which power is fed to the first radiating element.

4. The antenna device according to claim 3, wherein
when the number of radiating elements arrayed in the first direction is an odd number of five or more,
the feeder circuit includes one of the unequal three-way divider and an even number of two or more unequal two-way dividers, and
the unequal two-way divider feeds power to radiating elements or a radiating element group excluding a second radiating element with a power ratio different from a power ratio with which power is fed to the second radiating element in a radiating element group made up of radiating elements excluding the first radiating element.

5. The antenna device according to claim 2, wherein
the feeder circuit includes at least one unequal three-way divider, and
the unequal three-way divider feeds power to each of a radiating element group positioned on one side as seen from the first radiating element and a radiating element group positioned on another side as seen from the first radiating element with a power ratio different from a power ratio with which power is fed to the first radiating element.

6. The antenna device according to claim 5, wherein
when the number of radiating elements arrayed in the first direction is an odd number of five or more,
the feeder circuit includes one of the unequal three-way divider and an even number of two or more unequal two-way dividers, and
the unequal two-way divider feeds power to radiating elements or a radiating element group excluding a second radiating element with a power ratio different from a power ratio with which power is fed to the second radiating element in a radiating element group made up of radiating elements excluding the first radiating element.

7. The antenna device according to claim 1, wherein all of the radiating elements are radiating elements of the same type.

8. The antenna device according to claim 1, wherein the radiating elements are patch antennas.

* * * * *